US012675410B2

(12) United States Patent
Jeyarajaboopathy et al.

(10) Patent No.: US 12,675,410 B2
(45) Date of Patent: Jul. 7, 2026

(54) SYSTEM AND METHOD FOR MONITORING AND MANAGING CACHE DATA TO OPTIMIZE USE AND STORAGE OF DEVICE MEMORY

(71) Applicant: BANK OF AMERICA CORPORATION, Charlotte, NC (US)

(72) Inventors: Nevetha Jeyarajaboopathy, Nagercoil (IN); Ravindra Dabbiru, Hyderabad (IN); Rama Venkata S. Kavali, Frisco, TX (US); Venugopala Rao Randhi, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 155 days.

(21) Appl. No.: 18/591,901

(22) Filed: Feb. 29, 2024

(65) Prior Publication Data

US 2025/0278368 A1 Sep. 4, 2025

(51) Int. Cl.
*G06F 12/0871* (2016.01)
*G06F 12/0868* (2016.01)

(52) U.S. Cl.
CPC ...... *G06F 12/0871* (2013.01); *G06F 12/0868* (2013.01)

(58) Field of Classification Search
CPC .......................... G06F 12/0868; G06F 12/0871
See application file for complete search history.

(56) References Cited

U.S. PATENT DOCUMENTS

| | | | | |
|---|---|---|---|---|
| 6,772,203 | B1 * | 8/2004 | Feiertag | G06F 16/957 |
| | | | | 711/133 |
| 6,892,212 | B2 * | 5/2005 | Shuf | G06F 12/0269 |
| 7,124,276 | B2 | 10/2006 | Pullen et al. | |
| 7,581,064 | B1 | 8/2009 | Zedlewski et al. | |
| 9,454,488 | B2 | 9/2016 | Vilayannur et al. | |
| 9,612,964 | B2 | 4/2017 | Islam et al. | |
| 10,133,678 | B2 | 11/2018 | Eckert et al. | |
| 12,086,116 | B2 | 9/2024 | Subramanian et al. | |
| 12,124,383 | B2 | 10/2024 | Janus et al. | |
| 2004/0220970 | A1 | 11/2004 | Wilson | |
| 2007/0050548 | A1 | 3/2007 | Bali et al. | |
| 2008/0243969 | A1 * | 10/2008 | Wintergerst | G06F 11/3466 |
| 2013/0055278 | A1 * | 2/2013 | Zaitsev | G06F 12/0253 |
| | | | | 718/104 |
| 2014/0297604 | A1 | 10/2014 | Brand | |
| 2017/0286009 | A1 * | 10/2017 | Danilov | G06F 3/0652 |

(Continued)

*Primary Examiner* — Aracelis Ruiz
(74) *Attorney, Agent, or Firm* — Moore & Van Allen PLLC; Nicholas C. Russell

(57) ABSTRACT

Embodiments of the present invention provide a system for monitoring and managing cache data to optimize use and storage of device memory. The system is configured for identifying one or more application servers associated with one or more applications, collecting server statistics data associated with the one or more application servers, identifying one or more objects in each of the one or more application servers, classifying the one or more objects, ranking the one or more objects, monitoring the one or more application servers, determining that the one or more application servers meets a performance threshold, and performing one or more actions associated with the one or more objects to improve the performance threshold of the one or more application servers.

17 Claims, 6 Drawing Sheets

(56) References Cited

U.S. PATENT DOCUMENTS

| | | | |
|---|---|---|---|
| 2020/0097410 A1 | 3/2020 | Pusdesris et al. | |
| 2021/0357260 A1* | 11/2021 | Vijapur | G06F 9/5011 |
| 2022/0374158 A1* | 11/2022 | Yang | G06F 3/0647 |

* cited by examiner

SYSTEM AND METHOD FOR MONITORING AND MANAGING CACHE DATA TO OPTIMIZE USE AND STORAGE OF DEVICE MEMORY

BACKGROUND

There exists a need for a system for monitoring and managing cache data to optimize use and storage of device memory.

BRIEF SUMMARY

Embodiments of the present invention address the above needs and/or achieve other advantages by providing apparatuses (e.g., a system, computer program product and/or other devices) and methods for monitoring and managing cache data to optimize use and storage of device memory. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies one or more application servers associated with one or more applications, collects server statistics data associated with the one or more application servers, identifies one or more objects in each of the one or more application servers, classifies the one or more objects, ranks the one or more objects, monitors the one or more application servers, determines that the one or more application servers meets a performance threshold, and performs one or more actions associated with the one or more objects to improve the performance threshold of the one or more application servers In some embodiments, the present invention classifies the one or more objects via a distributed register algorithm.

In some embodiments, the present invention classifies the one or more objects based on one or more factors comprising at least one of size of memory associated with the one or more application servers, duration of active stage of the one or more objects, duration of inactive stage of the one or more objects, and network Input/Output time.

In some embodiments, the present invention classifies the one or more objects as active objects and inactive objects.

In some embodiments, the present invention ranks the one or more objects, via an artificial intelligence engine, based on one or more ranking metrics comprising at least one memory of the one or more application servers, space available in the memory of the one or more application servers, duration of active state of the one or more objects, duration of the inactive state of the one or more objects, criticality associated with the one or more objects, and access frequency associated with the one or more objects.

In some embodiments, the one or more actions comprise one or more of identifying and deleting orphan objects from the one or more objects based on classifying the one or more objects, identifying and deleting trivial objects of the one or more objects based on the ranking of the one or more objects, and notifying one or more users associated with the one or more applications deletion of at least one of the orphan objects and the trivial objects.

In some embodiments, the present invention deletes the at least one of the orphan objects and the trivial objects based on checking impact associated with deleting the at least one of the orphan objects and the trivial objects.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
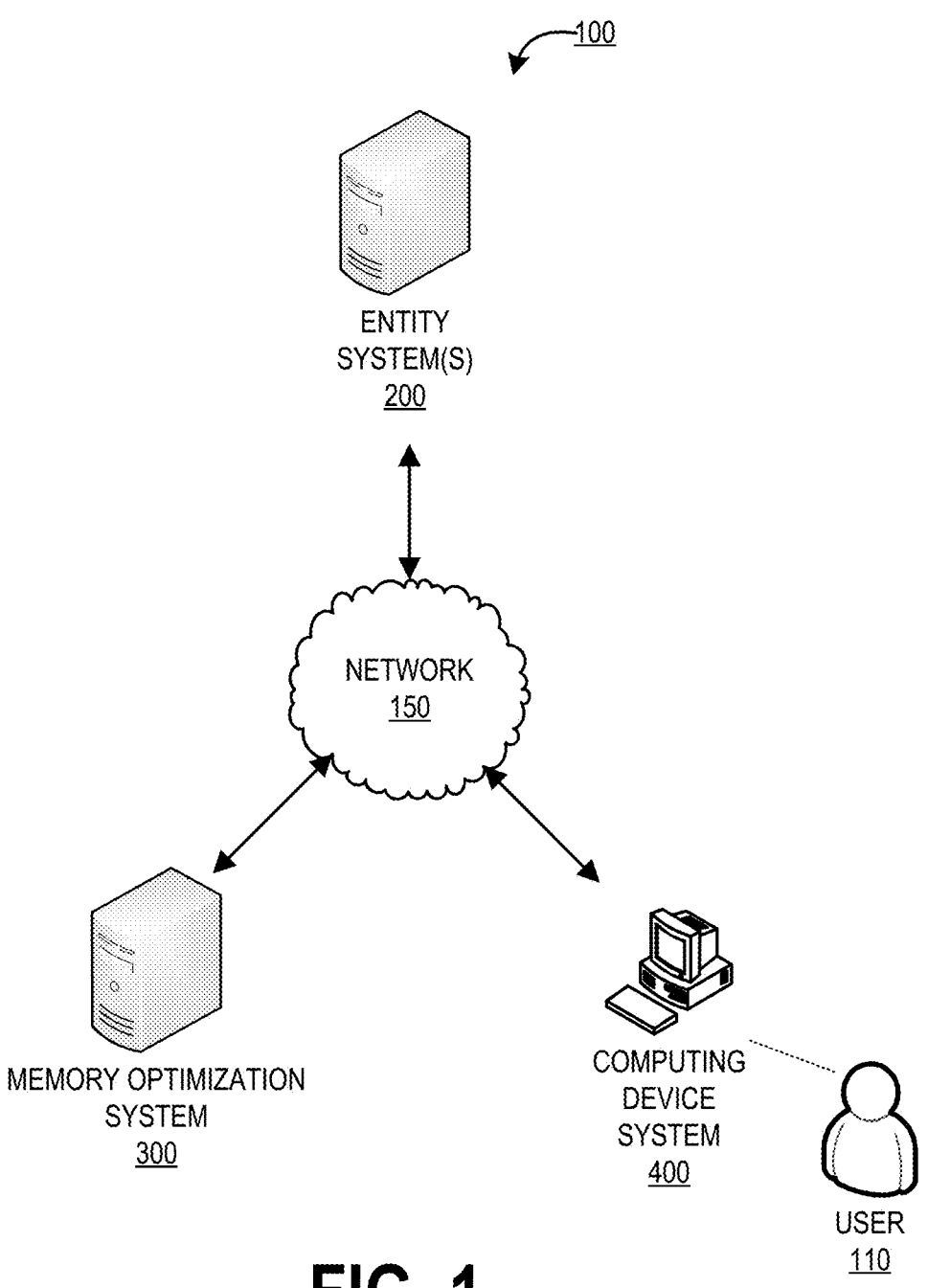
Figure 2:
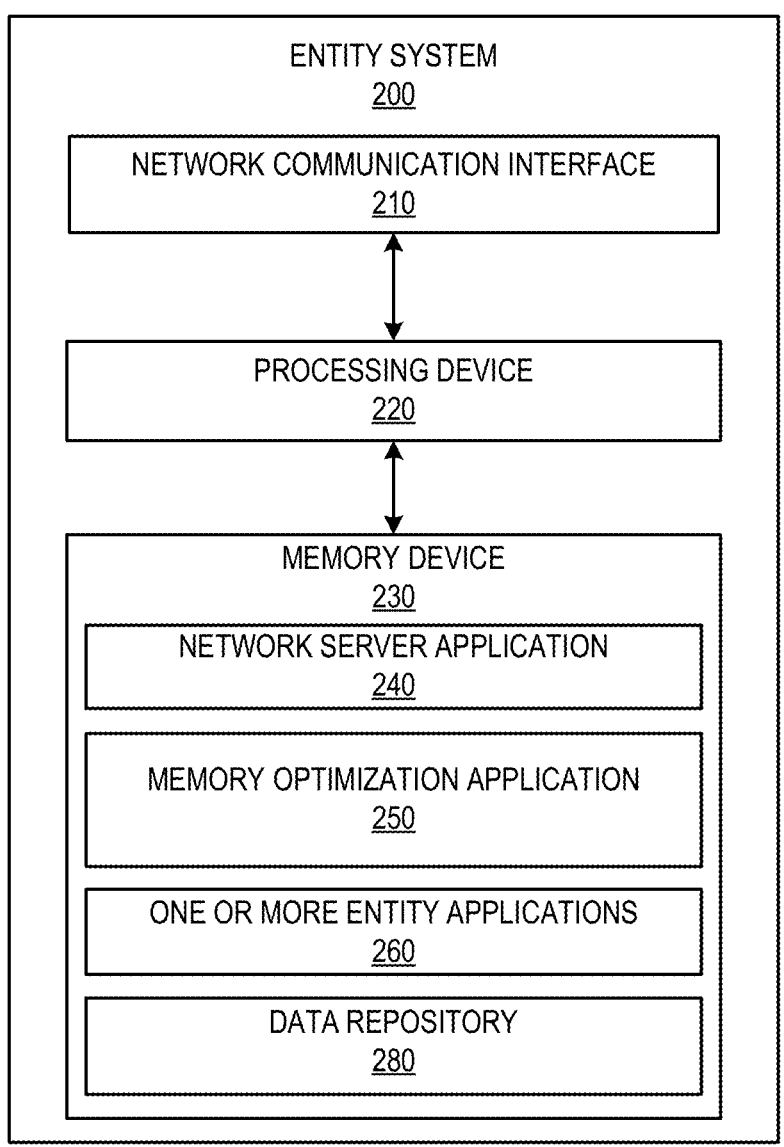
Figure 3:
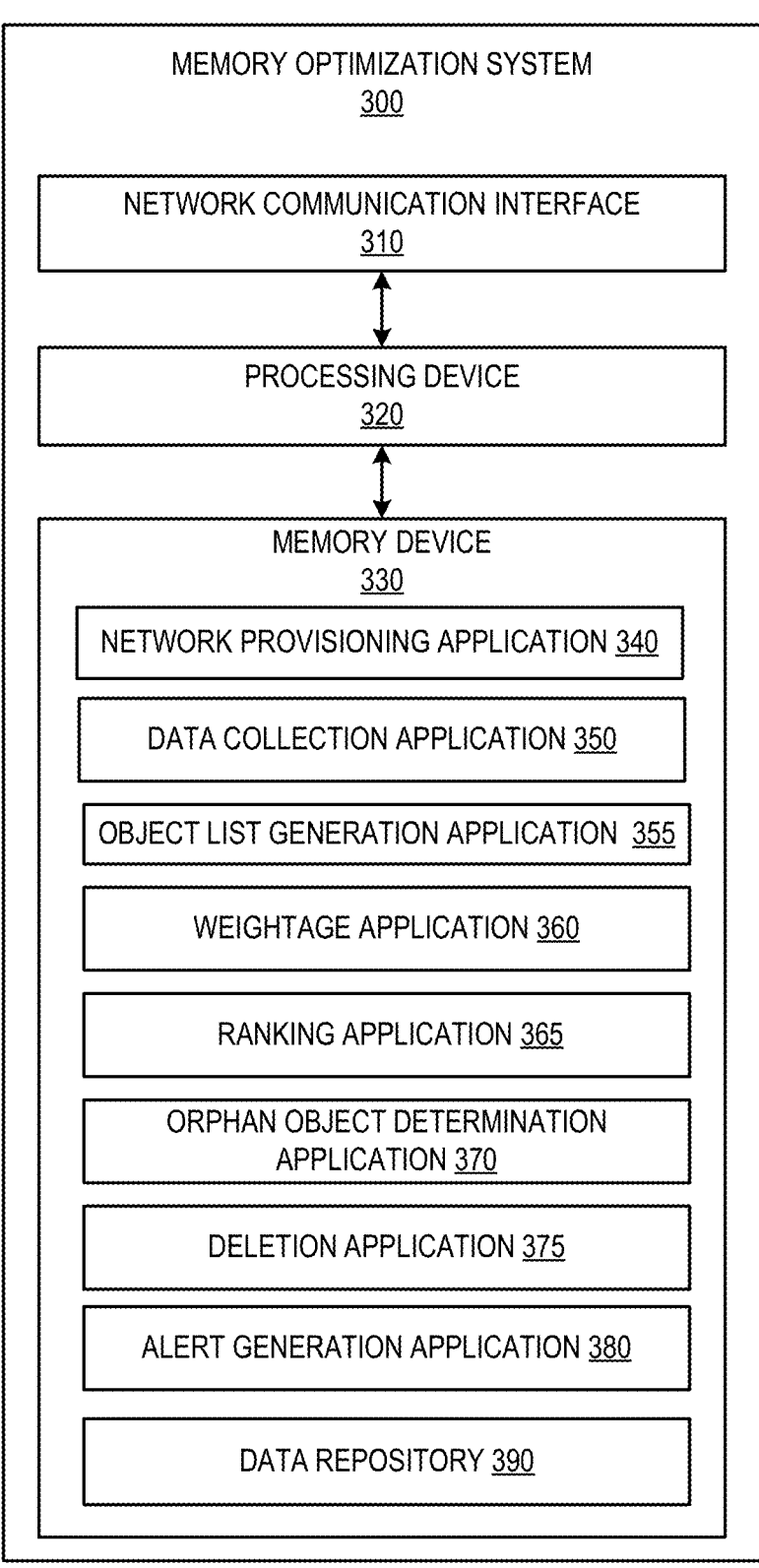
Figure 4:
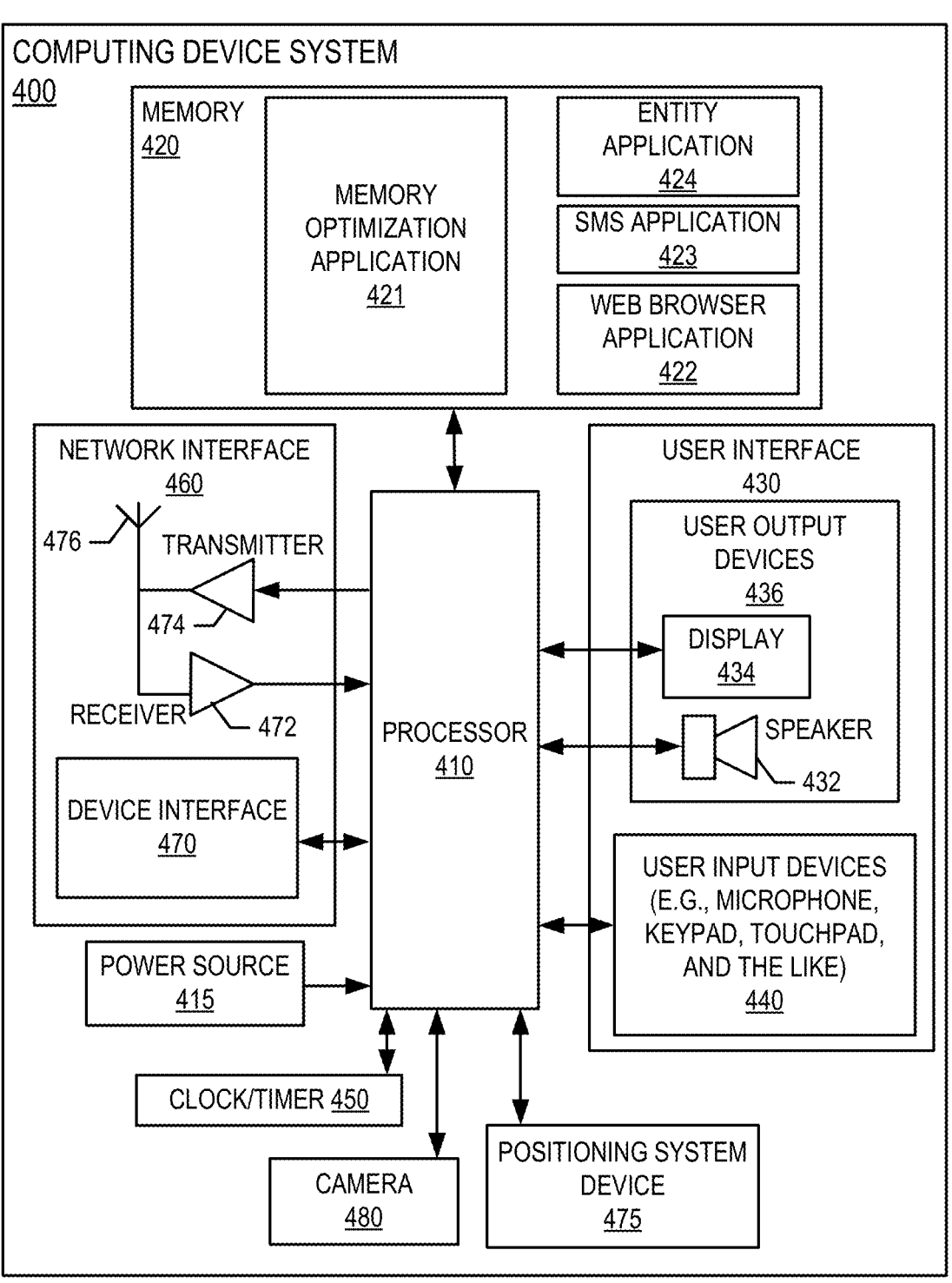
Figure 5A:
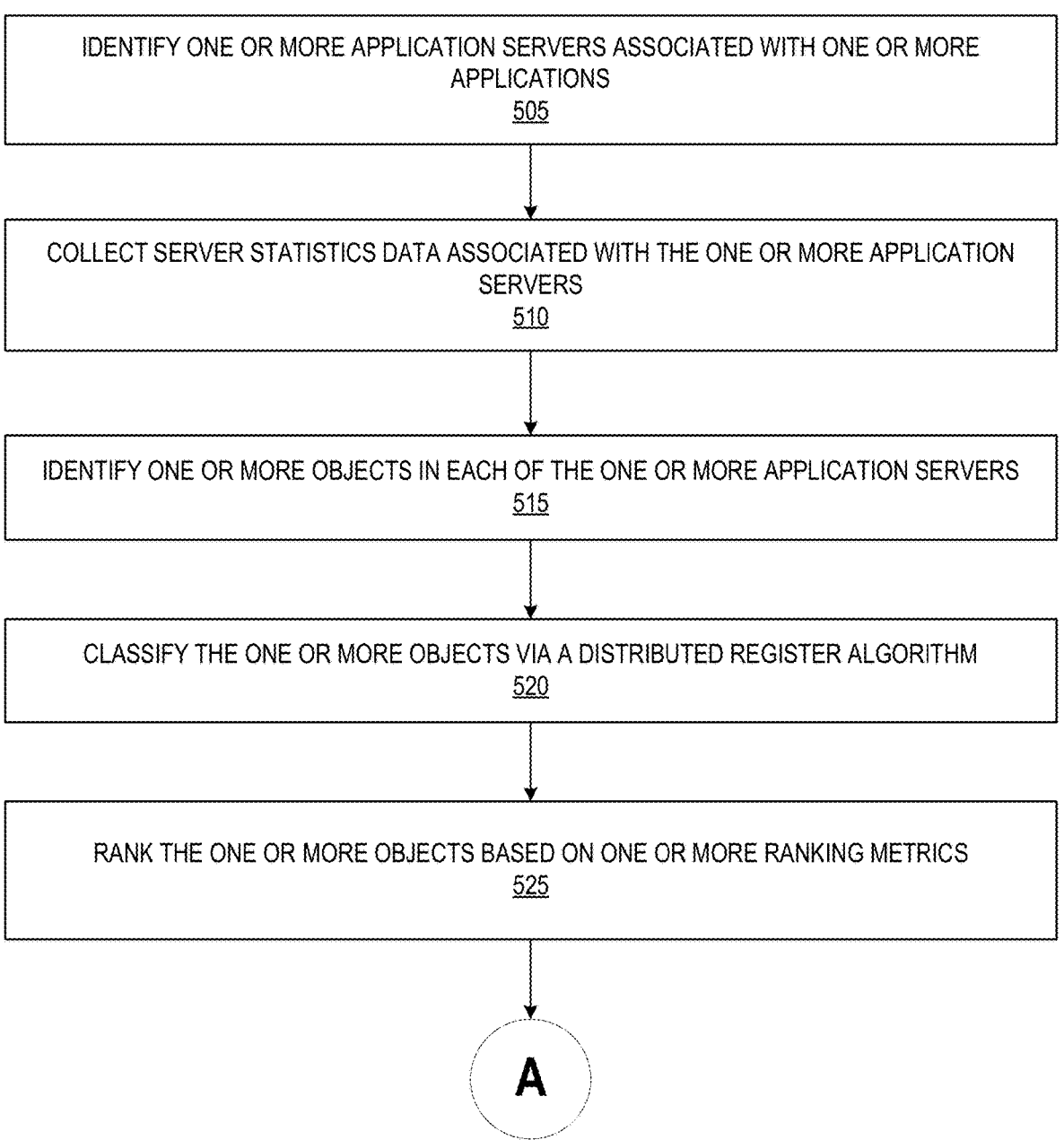
Figure 5B:
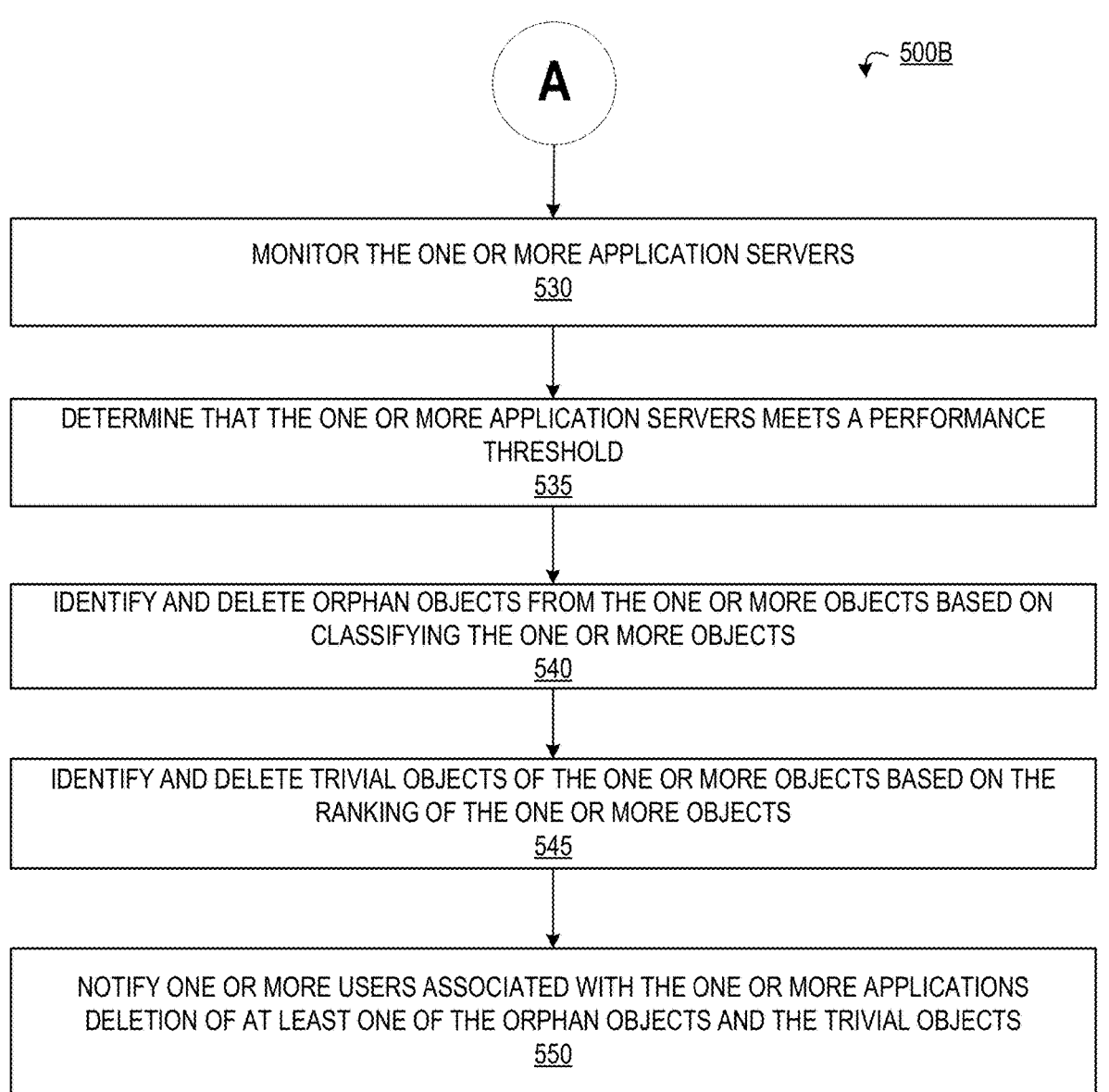

Having thus described embodiments of the invention in general terms, reference will now be made the accompanying drawings, wherein:

FIG. 1 provides a block diagram illustrating a system environment for monitoring and managing cache data to optimize use and storage of device memory, in accordance with an embodiment of the invention;

FIG. 2 provides a block diagram illustrating the entity system 200 of FIG. 1, in accordance with an embodiment of the invention;

FIG. 3 provides a block diagram illustrating a memory optimization system 300 of FIG. 1, in accordance with an embodiment of the invention;

FIG. 4 provides a block diagram illustrating the computing device system 400 of FIG. 1, in accordance with an embodiment of the invention; and FIGS. 5A and 5B provide a process flow for monitoring and managing cache data to optimize use and storage of device memory, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that creates, manages, develops, provides, maintains, and/or uses one or more applications (e.g., web applications, mobile applications, or the like) to perform one or more activities. In some embodiments, the entity may be a financial institution which may include any financial institutions such as commercial banks, thrifts, federal and state savings banks, savings and loan associations, credit unions, investment companies, insurance companies and the like. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications, systems, servers, and/or devices provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

FIG. 1 provides a block diagram illustrating a system environment 100 for monitoring and managing cache data to optimize use and storage of device memory, in accordance with an embodiment of the invention. As illustrated in FIG. 1, the environment 100 includes a memory optimization system 300, entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200 (e.g., software engineer, application developer, application tester, and/or the like). In some embodiments, the one or more user(s) 110 of the system environment 100 may further comprise end-users which may include, but are not limited to, customers, potential customers, or the like of the entity associated with the entity system 200.

The entity system(s) 200 may be any system owned or otherwise controlled by an entity to support or perform one or more process steps described herein. In some embodiments, the entity is a financial institution. In some embodiments, the entity is a non-financial institution.

The memory optimization system 300 is a system of the present invention for performing one or more process steps described herein. In some embodiments, the memory optimization system 300 may be an independent system. In some embodiments, the memory optimization system 300 may be a part of the entity system 200.

The memory optimization system 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the memory optimization system 300 is configured to communicate information or instructions with the entity system 200, and/or the computing device system 400 across the network 150.

The computing device system 400 may be a computing device of the user 110. In general, the computing device system 400 communicates with the user 110 via a user interface of the computing device system 400, and in turn is configured to communicate information or instructions with the memory optimization system 300 and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a memory optimization application 250, one or more entity applications 260, and a data repository 280. The computer-executable program code of the network server application 240, the memory optimization application 250, and the one or more entity applications 260 to perform certain logic, data-extraction, and data-storing functions of the entity system 200 described herein, as well as communication functions of the entity system 200.

The network server application 240, the memory optimization application 250, and the one or more entity applications 260 are configured to store data in the data repository 280 or to use the data stored in the data repository 280 when communicating through the network communication interface 210 with the memory optimization system 300, and the computing device system 400 to perform one or more process steps described herein. In some embodiments, the entity system 200 may receive instructions from the memory optimization system 300 via the memory optimization application 250 to perform certain operations. The memory optimization application 250 may be provided by the memory optimization system 300.

FIG. 3 provides a block diagram illustrating the memory optimization system 300 in greater detail, in accordance with embodiments of the invention. As illustrated in FIG. 3, in one embodiment of the invention, the memory optimization system 300 includes one or more processing devices 320 operatively coupled to a network communication interface 310 and a memory device 330. In certain embodiments, the memory optimization system 300 is operated by an entity, such as a financial institution, while in other embodiments, the memory optimization system 300 is operated by an entity other than a financial institution. In some embodiments, the memory optimization system 300 is owned or operated by the entity of the entity system 200. In some embodiments, the memory optimization system 300 may be an independent system. In alternate embodiments, the memory optimization system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the memory optimization system 300 described herein. For example, in one embodiment of the memory optimization system 300, the memory device 330 includes, but is not limited to, a network provisioning application 340, a data collection application 350, an object list generation application 360, a ranking application 365, an orphan object determination application 370, a deletion application 375, an alert generation application 380, and a data repository 390 comprising data processed or accessed by one or more applications in the memory device 330. The computer-executable program code of the network provisioning application 340, the data collection application 350, the object list generation application 360, the ranking application 365, the orphan object determination application 370, the deletion application 375, and the alert generation application 380 may instruct the processing device 320 to perform certain logic, data-processing, and data-storing functions of the memory optimization system 300 described herein, as well as communication functions of the memory optimization system 300.

The network provisioning application 340, the data collection application 350, the object list generation application 360, the ranking application 365, the orphan object determination application 370, the deletion application 375, and the alert generation application 380 are configured to invoke or use the data in the data repository 390 when communicating through the network communication interface 310 with the entity system 200, and the computing device system 400. In some embodiments, the network provisioning application 340, the data collection application 350, the object list generation application 360, the ranking application 365, the orphan object determination application 370, the deletion application 375, and the alert generation application 380 may store the data extracted or received from the entity system 200 and the computing device system 400 in the data repository 390. In some embodiments, the network provisioning application 340, the data collection application 350, the object list generation application 360, the ranking application 365, the orphan object determination application 370, the deletion application 375, and the alert generation application 380 may be a part of a single application. One or more processes performed by the network provisioning application 340, the data collection application 350, the object list generation application 360, the ranking application 365, the orphan object determination application 370, the deletion application 375, and the alert generation application 380 are described in detail below.

FIG. 4 provides a block diagram illustrating a computing device system 400 of FIG. 1 in more detail, in accordance with embodiments of the invention. However, it should be understood that the computing device system 400 is merely illustrative of one type of computing device system that may benefit from, employ, or otherwise be involved with embodiments of the present invention and, therefore, should not be taken to limit the scope of embodiments of the present invention. The computing devices may include any one of portable digital assistants (PDAs), pagers, mobile televisions, mobile phone, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 150. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a memory optimization application 421, an entity application 424, or the like. These applications also typically provide instructions to a graphical user interface (GUI) on the display 430 that allows the user 110 to interact with the entity system 200, the memory optimization system 300, and/or other devices or systems. The memory 420 of the computing device system 400 may comprise a Short Message Service (SMS) application 423 configured to send, receive, and store data, information, communications, alerts, and the like via the wireless network 150.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIGS. 5A and 5B provide a process flow for monitoring and managing cache data to optimize use and storage of device memory, in accordance with an embodiment of the invention. As shown in block 505, the system identifies one or more application servers associated with one or more applications. The one or more applications may be any applications developed, maintained, managed, used, and/or the like by an entity, where the entity may be a financial institution or a non-financial institution. The one or more applications servers may be any servers (e.g., entity systems 200) that are hosting, executing, storing, and/or the like the one or more applications.

As shown in block 510, the system collects server statistics data associated with the one or more application servers. Server statistics data may comprise components information (e.g., memory size, temporary memory size, processor speed, and/or the like) response time, total application related requests received by the one or more application servers, timeouts, and/or the like. In some embodiments, the system may classify the one or more application servers. In some such embodiments, the classification may be based on criticality of the one or more applications, criticality of the one or more application servers, dependencies associated with the one or more applications and the one or more application servers, number of application related requests received by the one or more application servers, and/or the like.

As shown in block 515, the system identifies one or more objects in each of the one or more application servers. The one or more objects may be any application related objects that are created during execution of one or more parts of the one or more applications, wherein the one or more applications are executed when application related requests are received by the one or more application servers from one or more users (e.g., end users, entity users, or the like), other entity systems, and/or the like.

As shown in block 520, the system classifies the one or more objects via a distributed register algorithm. In some embodiments, the distributed register algorithm may be a time distributed register algorithm (e.g., time blockchain algorithm). Classification of the one or more objects is performed based on one or more factors comprising at least one of the size of the memory associated with the one or more application servers, duration of active stage of the one or more objects, duration of inactive stage of the one or more objects, network Input/Output time, and/or the like. Duration of active stage of the one or more objects may be the time the objects are being used by the one or more applications, the one or more application servers, or other systems associated with the one or more applications. Duration of inactive stage of the one or more objects may be the time the one or more objects are not being used by any applications, applications servers, or the like. Network Input/Output time may be the time associated with data transfers between different applications, application servers, or the like. In some embodiments, classification of the one or more objects may comprise classifying the one or more objects as active objects, inactive objects, orphan objects, or the like. Active objects may be objects that are being used frequently. Inactive objects may be objects that are not being used frequently (e.g., used yearly, quarterly, or the like). Orphan objects may be objects that are not associated with any applications. In some embodiments, the orphan objects may be any objects that have no information associated with source of origination, historical usage data, or the like. In some embodiments, the orphan objects may be classified as inactive objects.

As shown in block 525, the system ranks the one or more objects based on one or more ranking metrics. In some embodiments, the system may use an artificial intelligence engine to perform ranking of the one or more objects. In some embodiments, the system may dynamically calculate and assign weightages in real-time for each of the one or more objects. The calculation of weightages and determination of ranking may be based on one or more ranking metrics comprising at least one memory of the one or more application servers, space available in the memory of the one or more application servers, duration of active state of the one or more objects, duration of the inactive state of the one or more objects, criticality associated with the one or more objects, and access frequency associated with the one or more objects.

As shown in block 530, the system monitors the one or more application servers. The system may continuously monitor the health of the one or more application servers. Monitoring the health of the one or more application servers may comprise liveness checks, readiness checks, process status, anomaly checks, CPU usage check, memory usage check, processor speed check, and/or the like.

As shown in block 535, the system determines that the one or more application servers meets a performance threshold. In some embodiments, the performance threshold may be predefined threshold. In some embodiments, the performance threshold may be dynamically calculated by the artificial intelligence engine based on current application requests that are being executed by the one or more application servers, future predicted application requests, and/or the like. Once the system determines that the performance threshold is met, the system implements the steps in block 540 through 550. For example, the system may determine that an application server performance falls below the predetermined threshold and may implement one or more actions to improve the application server health and performance. Typically conventional systems shutdown or restart when performance of servers deteriorate, thereby causing service interruptions to one or more users, higher restart times, loss of data, or the like. As such, the system avoids unnecessary restart of the one or more servers by performing one or more actions.

As shown in block 540, the system identifies and deletes orphan objects from the one or more objects based on classifying the one or more objects. The system identifies orphan objects, where orphan objects consume memory that may be utilized for executing other requests. The system determines if deletion of the orphan objects has any impact on the one or more applications, the one or more application servers, one or more application related requests, related applications, related application servers, or the like. Upon deletion of the orphan objects, memory that was previously consumed by the orphan objects becomes available for processing any application requests, thereby improving the performance and health of the one or more application servers.

As shown in block 545, the system identifies and deletes trivial objects of the one or more objects based on the ranking of the one or more objects. The system identifies trivial objects, where trivial objects consume memory that may be utilized for executing other requests. For example, the system may identify and delete that have lower weights as explained in block 525. The system determines if deletion of the trivial objects has any impact on the one or more applications, the one or more application servers, one or more application related requests, related applications, related application servers, or the like. Upon deletion of the trivial objects, memory that was previously consumed by the trivial objects becomes available for processing any application requests, thereby improving the speed of processing the application requests along with improving the performance and health of the one or more application servers. As shown in block 550, the system notifies one or more users associated with the one or more applications deletion of at least one of the orphan objects and the trivial objects.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for monitoring and managing cache data to optimize use and storage of device memory, comprising:
   at least one processing device;
   at least one memory device; and
   a module stored in the at least one memory device comprising executable instructions that when executed by the at least one processing device, cause the at least one processing device to:
   identify one or more application servers associated with one or more applications;
   collect server statistics data associated with the one or more application servers;
   identify one or more objects in each of the one or more application servers;
   classify the one or more objects based on a plurality of factors comprising size of memory associated with the one or more application servers, duration of active stage of the one or more objects, duration of inactive stage of the one or more objects, and network Input/Output time;
   rank the one or more objects;
   monitor the one or more application servers;
   dynamically calculate a performance threshold, via an artificial intelligence engine, based on current application requests that are being executed by the one or more application servers and future predicted application requests;
   determine that the one or more application servers meets the performance threshold that is calculated dynamically; and
   perform one or more actions associated with the one or more objects to improve the performance threshold of the one or more application servers.

2. The system according to claim 1, wherein the executable instructions cause the at least one processing device to classify the one or more objects via a distributed register algorithm.

3. The system according to claim 1, wherein the executable instructions cause the at least one processing device to classify the one or more objects as active objects and inactive objects.

4. The system according to claim 1, wherein the executable instructions cause the at least one processing device to rank the one or more objects, via an artificial intelligence engine, based on one or more ranking metrics comprising at least one memory of the one or more application servers, space available in the memory of the one or more application servers, duration of active state of the one or more objects, duration of inactive state of the one or more objects, criticality associated with the one or more objects, and access frequency associated with the one or more objects.

5. The system according to claim 1, wherein the one or more actions comprise at least one of:
    identifying and deleting orphan objects from the one or more objects based on classifying the one or more objects;
    identifying and deleting trivial objects of the one or more objects based on the ranking of the one or more objects; and
    notifying one or more users associated with the one or more actions.

6. The system according to claim 5, wherein the executable instructions cause the at least one processing device to delete the at least one of the orphan objects and the trivial objects based on checking impact associated with deleting the at least one of the orphan objects and the trivial objects.

7. A computer program product for monitoring and managing cache data to optimize use and storage of device memory, comprising a non-transitory computer-readable storage medium having computer-executable instructions for:
    identifying one or more application servers associated with one or more applications;
    collecting server statistics data associated with the one or more application servers;
    identifying one or more objects in each of the one or more application servers;
    classifying the one or more objects based on a plurality of factors comprising size of memory associated with the one or more application servers, duration of active stage of the one or more objects, duration of inactive stage of the one or more objects, and network Input/Output time;
    ranking the one or more objects;
    monitoring the one or more application servers;
    dynamically calculating a performance threshold, via an artificial intelligence engine, based on current application requests that are being executed by the one or more application servers and future predicted application requests;
    determining that the one or more application servers meets the performance threshold that is calculated dynamically; and
    performing one or more actions associated with the one or more objects to improve the performance threshold of the one or more application servers.

8. The computer program product according to claim 7, wherein the non-transitory computer-readable storage medium comprises computer-executable instructions for classifying the one or more objects via a distributed register algorithm.

9. The computer program product according to claim 7, wherein the non-transitory computer-readable storage medium comprises computer-executable instructions for classifying the one or more objects as active objects and inactive objects.

10. The computer program product according to claim 7, wherein the non-transitory computer-readable storage medium comprises computer-executable instructions for ranking the one or more objects, via an artificial intelligence engine, based on one or more ranking metrics comprising at least one memory of the one or more application servers, space available in the memory of the one or more application servers, duration of active state of the one or more objects, duration of inactive state of the one or more objects, criticality associated with the one or more objects, and access frequency associated with the one or more objects.

11. The computer program product according to claim 7, wherein the one or more actions comprise at least one of:
    identifying and deleting orphan objects from the one or more objects based on classifying the one or more objects;
    identifying and deleting trivial objects of the one or more objects based on the ranking of the one or more objects; and
    notifying one or more users associated with the one or more actions.

12. The computer program product according to claim 11, wherein the non-transitory computer-readable storage medium comprises computer-executable instructions for deleting the at least one of the orphan objects and the trivial objects based on checking impact associated with deleting the at least one of the orphan objects and the trivial objects.

13. A computerized method for monitoring and managing cache data to optimize use and storage of device memory, the method comprising:
    identifying one or more application servers associated with one or more applications;
    collecting server statistics data associated with the one or more application servers;
    identifying one or more objects in each of the one or more application servers;
    classifying the one or more objects based on a plurality of factors comprising size of memory associated with the one or more application servers, duration of active stage of the one or more objects, duration of inactive stage of the one or more objects, and network Input/Output time;
    ranking the one or more objects;
    monitoring the one or more application servers;
    dynamically calculating a performance threshold, via an artificial intelligence engine, based on current application requests that are being executed by the one or more application servers and future predicted application requests;
    determining that the one or more application servers meets the performance threshold that is calculated dynamically; and
    performing one or more actions associated with the one or more objects to improve the performance threshold of the one or more application servers.

14. The computerized method according to claim 13, wherein the method comprises classifying the one or more objects via a distributed register algorithm.

15. The computerized method according to claim 13, wherein the method further comprises classifying the one or more objects as active objects and inactive objects.

16. The computerized method according to claim 13, wherein the method comprises ranking the one or more objects, via an artificial intelligence engine, based on one or more ranking metrics comprising at least one memory of the one or more application servers, space available in the memory of the one or more application servers, duration of active state of the one or more objects, duration of inactive state of the one or more objects, criticality associated with the one or more objects, and access frequency associated with the one or more objects.

17. The computerized method according to claim 16, wherein the one or more actions comprise at least one of:

identifying and deleting orphan objects from the one or more objects based on classifying the one or more objects;

identifying and deleting trivial objects of the one or more objects based on the ranking of the one or more objects; and notifying one or more users associated with the one or more actions.

* * * * *